INVENTOR.
CHARLES W. MANRY,
MARTIN E. CHENEVERT,
BY John B Davidson
ATTORNEY

April 9, 1968   C. W. MANRY ET AL   3,376,921
COMPLETION OF WELLS
Filed July 8, 1966   2 Sheets-Sheet 2

INVENTOR.
CHARLES W. MANRY,
MARTIN E. CHENEVERT,
BY
*John B Davidson*
ATTORNEY.

United States Patent Office

3,376,921
Patented Apr. 9, 1968

3,376,921
COMPLETION OF WELLS
Charles W. Manry and Martin E. Chenevert, Houston, Tex., assignors to Esso Production Research company, a corporation of Delaware
Filed July 8, 1966, Ser. No. 563,919
8 Claims. (Cl. 166—4)

This invention relates to the cementing of pipe strings in boreholes, and more particularly to a technique for cementing a multiplicity of pipe strings in boreholes wherein the pipe strings are vertically reciprocated while the cement is still in liquid form.

One of the customary steps in connection with the completion of oil and gas wells is to bond or cement conductors or pipe strings to the earth formations surrounding the borehole for the purpose of isolating oil and gas productive formations from each other, and also to prevent fluid communication between oil and gas productive formations and any water formations that may be present. In order to prevent channeling of cement through the mud that the cement is supposed to displace, it is a recommended practice to vertically reciprocate the pipe string or strings while cement is being pumped down one or more of the pipe strings. When a plurality of pipe strings is thus being simultaneously cemented in place, a certain predetermined tensile stress in each pipe must not be exceeded or the pipe will part. When a single pipe string is being cemented, the drilling rig's weight indicator will give a measure of force being applied to the string. However, when a plurality of strings of pipe are to be cemented in a borehole, the weight indicator on the drilling rig indicates the total force applied to all strings of the pipe so that if one string of pipe is stuck to the sides of the borehole and the remaining pipe or pipes move with ease, the majority of the force will be applied to the string which is stuck. Manipulating the pipes separately is undesirable because usually the pipe strings are intertwined.

In accordance with one aspect of the present invention, all of the pipe strings in a borehole are vertically reciprocated prior to cementing, during the cement placement, and for a time after placement, while the cement therein remains in a fluid condition. The strain in each of the pipe strings is separately measured at a location at the top of the pipe strings. Reciprocation of the pipe strings is discontinued when the load on either pipe string is of a value such that a predetermined fraction of the tensile strength of that pipe string is exceeded.

Further in accordance with the invention, when a plurality of pipe strings is vertically reciprocated in a well bore during cementing operations, there is used a plurality of pipe string sections, one corresponding to each of the pipe strings for connecting the respective pipe strings to the pipe string elevator. At least one strain gauge transducer is positioned on each of said pipe string sections for producing an electrical indication of strain in such pipe string section. Means are connected to the strain gauge transducer for producing an output signal of the relative magnitudes of the electrical indications produced by the transducer.

Objects and features of the invention not apparent from the above discussion will become evident upon consideration of the following detailed description of the invention taken in connection with the accompanying drawings, wherein.

Figure 1:
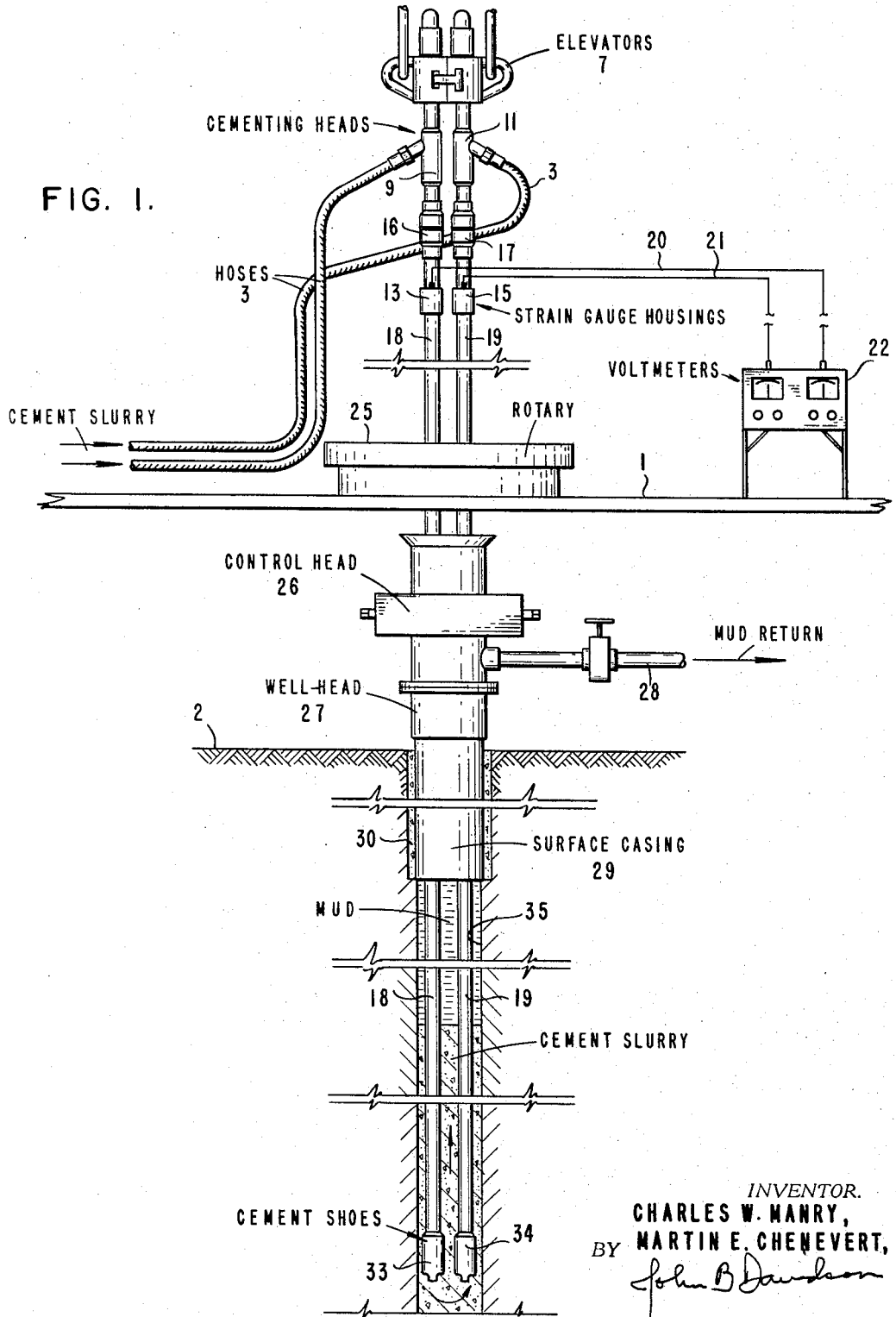
FIG. 1 is a schematic showing of a well installation incorporating an embodiment of the invention.
Figure 2:
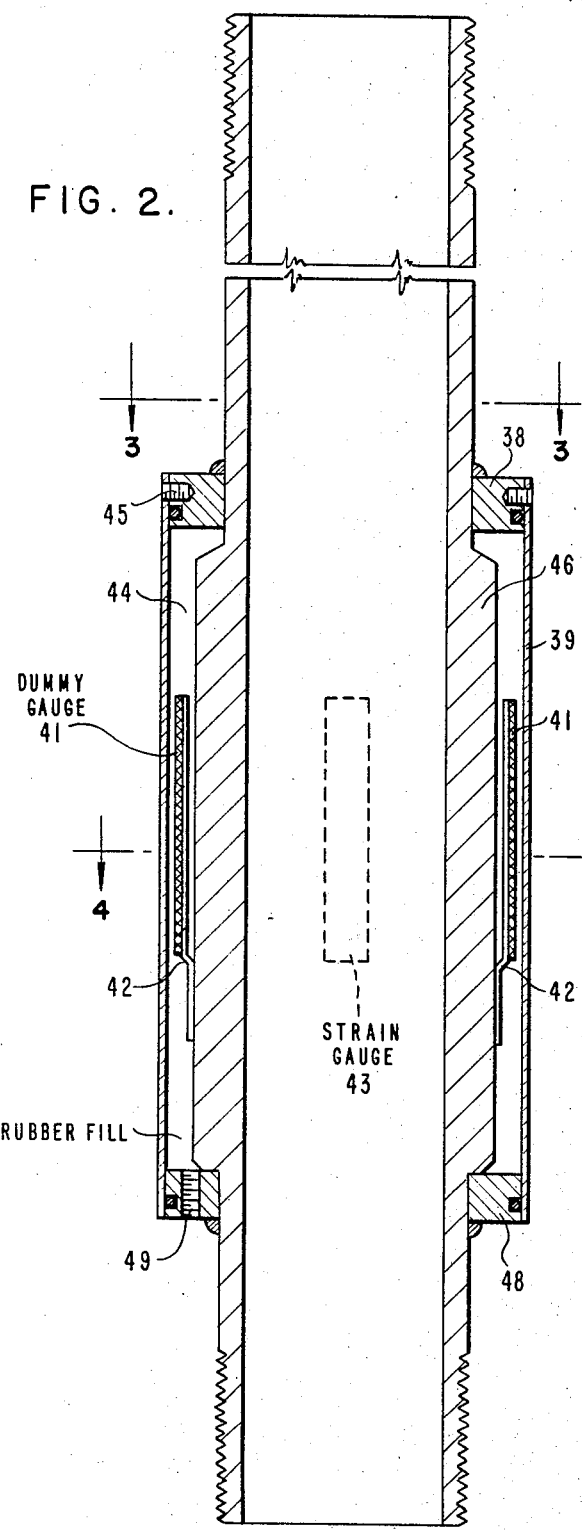
FIG. 2 is a cross sectional view of a strain gauge housing indicated by reference numerals 13 and 15 in FIG. 1.
Figure 3:
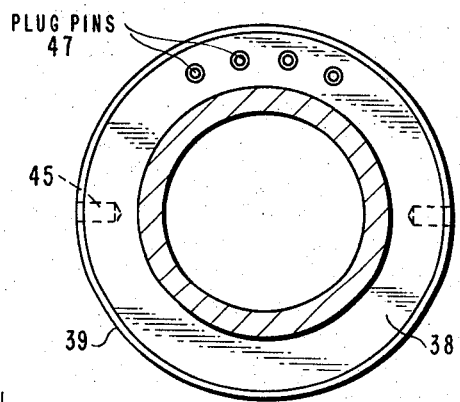
FIG. 3 is a cross-sectional view taken along section line 3—3 of FIG. 2.
Figure 4:
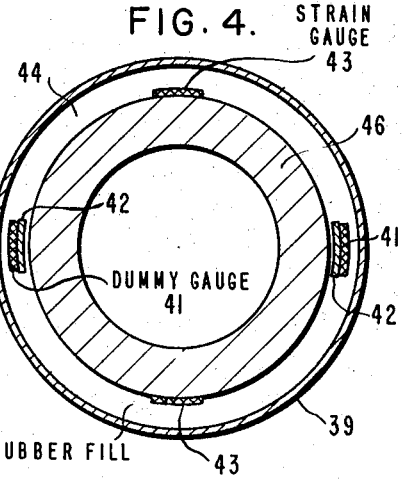
FIG. 4 is a cross-sectional view taken along section line 4—4 of FIG. 2.

In FIG. 1 there is illustrated a borehole 35 that has been drilled in the earth from the earth's surface 2 by suitable drilling apparatus which is not shown, it being assumed that the drilling of the borehole has been completed and that the drill pipe has been removed from the borehole. The rotary table 25 is illustrated as remaining in place on the drilling rig floor 1. A suitable well head 27, including a control head 26 and an overflow line 28, is illustrated as being supported by surface casing 29 which was previously cemented in place by a cement sheath 30 during the course of the drilling operations. Extending through the control head 26 and the well head 27 and the surface casing 29 into the borehole and suspended by a suitable elevator 7 are a pair of pipe strings 18 and 19 connected to the elevator 7 by cementing head assemblies 9 and 11, which include swivels 16 and 17. Guide shoes or comparable equipment 33 and 34 are affixed to the lower end of pipe strings 18 and 19, respectively. Cementing hoses 3 are connected to the heads 9 and 11 and to cementing pumps not shown. Strain gauge housings 13 and 15 are incorporated in pipe string sections 9 and 11 and are connected to an instrument housing 22 through suitable electrical cables, which may be multiconductor cables, 20 and 21. The details of the strain gauge housings are illustrated in FIGS. 2, 3, and 4. Cement is illustrated as being pumped into the hose 3 through cementing heads 9 and 11, swivels 16 and 17, and pipe strings 18 and 19, and guide shoes 33 and 34 into the lower end of borehole 35 while the pipe strings 18 and 19 are being vertically reciprocated in the borehole by elevator 7.

The pipe strings 9 and 11 and the associated strain gauge housings 13 and 15 are substantially identical and the constructional details thereof are illustrated in FIGS. 2, 3 and 4. The pipe string sections themselves are preferably between 18 inches and 5 feet in length and have an enlarged area 46 located thereon onto which are affixed a pair of oppositely disposed strain gauges 43, which may be semiconductor strain gauges as manufactured by Baldwin-Lima-Hamilton. Preferably, the strain gauges are cemented directly to the enlarged section 46 of the pipe string by an epoxy resin type of cement. A pair of oppositely disposed clips 42 are affixed to the enlarged section 46 and are oppositely positioned on the enlarged section 46 so as to be 90° removed from strain gauges 43. Onto each of the clips 42 is cemented a dummy strain gauge 41 substantially identical to the strain gauges 43 so that the strain gauges are held a short distance away from the pipe string section by the clip. A housing including a pair of annular end plates 38 and 48 and a sleeve 39 integrally connected to end plate 48 and affixed to end plate 38 by lock screws 45 is positioned around the strain gauges so as to protect them against damage from environmental conditions. A fill port 49 is provided in the annular end plate 48 so that the space 44 around the strain gauges can be filled with a suitable protective fill material which may be injected in liquid form and which will harden after a period of time. A suitable fill material for this purpose is silicon rubber. Electrical connections through pin plugs 47 in end plate 38 lead from each of the strain gauges 41 and 43 to suitable electrical measuring apparatus 22 on the drilling rig floor, and are electrically connected together and to the measuring apparatus 22, as illustrated in FIGS. 5 and 6.

Figure 5:
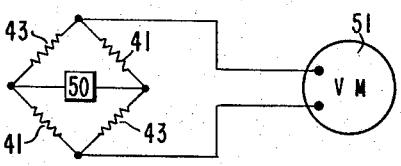
FIG. 5 is a schematic electrical diagram illustrating one means for connecting the strain gauges of FIG 2 in circuit relationship with a voltmeter, as shown in FIG 1.

With reference now to FIG. 5, the strain gauges 41 and 43 are illustrated as being connected in a Wheatstone bridge along with a direct current source 50 and a voltmeter 51. The strain gauges 43 are in opposite legs of the bridge to provide one current path for electrical current from source 50 to voltmeter 51, and strain gauges 41 are connected in the other opposite legs of the bridge to provide the other current path for current from source 50 to voltmeter 51. The advantage of using the dummy gauges is that changes in temperature in cement or mud passing through the pipe string section will not affect the balance of the bridge since all four transducers will be equally affected in resistance by temperature changes. When the strain in the pipe string section increases, as by a load being applied thereon, the resistance of strain gauge transducers 43 will increase but the resistance of strain gauge transducers 41 will remain the same. The voltage measured by voltmeter 51 across the output terminals of the bridge will therefore increase and will afford a measure of the strain in the pipe string. When the circuit connection of FIG. 5 is used, obviously two voltmeters must be used in the instrument housing 22, one voltmeter being connected to the strain gauges in the respective pipe strings 18 and 19. When the strain in the pipe string sections 18 and 19 is equal, the meter readings will be the same. However, should the strain in one of the pipe strings become greater than the other, as when one of the pipe strings becomes stuck against the walls of the borehole, vertical reciprocation of the elevator 7 will result in unequal readings on the voltmeter. The operator will then be alerted to the fact that an unbalanced, and possibly unsafe, condition exists in the well. When the unbalance becomes sufficiently great so that the tensile strength of one of the pipe strings is approached, vertical reciprocation should be discontinued before the pipe strings break.

Figure 6:
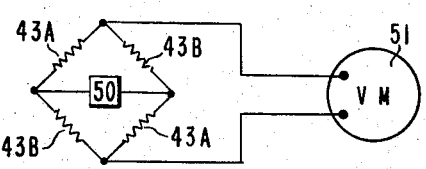
FIG. 6 is an electrical diagram showing a preferred manner of connecting the strain gauges of FIG. 2 in circuit relationship with a voltmeter in accordance with the invention.

In FIG. 6 there is illustrated a preferred connection for the strain gauge transducers. The inactive or dummy gauges 41 in each pipe string are disconnected. In FIG. 6 reference numerals 43A and 43B respectively refer to the active strain gauges in pipe string sections 18 and 19. Strain gauges 43A are connected in opposite legs of the Wheatstone bridge so as to provide one current path for flow between source 50 and voltmeter 51, and active gauges 43B are connected in the other current conduction path between source 50 and voltmeter 51. When pipe string 18 becomes hung up or sticks against the wall of the borehole, the bridge will become unbalanced in one direction to produce a voltage of one polarity across the output terminals of the Wheatstone bridge, and when pipe string 19 becomes hung up or sticks against the wall of the borehole, strain gauge 43B will increase in resistance to produce an output voltage of opposite polarity across the output terminals of the strain gauge. Thus, when the voltmeter 51 deflects in one direction, there will be an indication that one pipe string is stuck against the walls of the borehole, and a deflection in the other direction means that the other pipe string is stuck against the walls of the borehole. After the cement has been placed in the bottom of the well bore and the pipe strings have been reciprocated until a good bond between the pipe strings and the surrounding earth formations is assured, one of the pipe strings may be raised until the lower end thereof is at or slightly below the lowermost intersection of the uppermost productive earth formation with the borehole. Alternatively, the pipe strings of equal length may be cemented to the same depth. Cementing pipe strings to the same depth has the advantage that one good pipe string will always be available for production from the lowermost productive zone should there be a failure of the other pipe string, as by corrosion. After waiting a period of time for the cement to set, suitable perforating means will be lowered individually into the pipe strings and the pipe strings will be perforated. Thereafter, the wells will be placed on production in the usual manner for tubingless completions.

Although the embodiments disclosed in the preceding specification are preferred, other modifications will be apparent to those skilled in the art which do not depart from the broadest aspects of the scope of the invention.

What is claimed is:

1. Apparatus for use with a plurality of well pipe strings in a borehole and a pipe string elevator for vertically reciprocating the pipe strings, comprising:
    a plurality of pipe string sections for connecting each of said well pipe strings to said pipe string elevator;
    at least one strain gauge transducer on each of said pipe string sections for producing an electrical indication of strain in said each pipe string section;
    means for producing an output signal of the relative magnitudes of said electrical indication.

2. The apparatus of claim 1 wherein said means for producing an output signal comprises a Wheatstone bridge and wherein the strain gauge on one pipe string is in one current conduction path, and the strain gauge of another pipe string is in the other current conduction path of the Wheatstone bridge.

3. The apparatus of claim 2 wherein the strain gauge means on each pipe string comprises a strain gauge connected to the outer surface of the pipe string section and a dummy gauge in close proximity to the pipe string section, said strain gauge transducer and said dummy strain gauge transducer being in different current conduction paths of the Wheatstone bridge.

4. In a process of cementing a plurality of pipe strings in a borehole wherein a quantity of cement is deposited through at least one of the pipe strings into the lower portion of the borehole, the improvement comprising:
    vertically reciprocating all of the pipe strings prior to cementing, during cement placement and while the cement remains in a fluid condition;
    measuring the strain in each of said pipe strings; and
    discontinuing reciprocation of said pipe strings when the load on said pipe strings becomes unbalanced such that the load on any one of said pipe strings becomes of a value to exceed a predetermined fraction of the tensile strength of said one of said pipe strings.

5. The method of claim 4 wherein all of the pipe strings extend to the same depth in the borehole, and wherein cement is pumped simultaneously through all of the pipe strings.

6. Apparatus for measuring strain in a well pipe string comprising:
    a section of well pipe for connection in the pipe string;
    an annular housing connected to the exterior of said well pipe section for defining an enclosed space between said housing and said well pipe section;
    first strain gauge means connected to said well pipe section within said housing for producing electrical signals indicative of the strain in said well pipe section;
    strain gauge support means connected at one end to said well pipe section within said housing and spaced along a portion of the length thereof from both said well pipe section and said housing;

reference strain gauge means connected to said support means on said portion thereof; and electrical circuit means connected to said first strain gauge means and said reference strain gauge means for comparing the strain indications produced by said first strain gauge means and said reference strain gauge means.

7. The combination of claim 6 further including a substantially electrically non-conductive fill material in said space defined by said well pipe section and said annular housing.

8. The combination of claim 6 wherein said electrical circuit means includes a Wheatstone bridge circuit and said first strain gauge means is in one current conduction path of the bridge circuit and said reference strain gauge means is in the other current conduction path of the bridge circuit.

References Cited

UNITED STATES PATENTS

| | | | |
|---|---|---|---|
| 2,070,320 | 2/1937 | Shields | 73—151 |
| 2,183,078 | 12/1939 | Kemler | 73—151 |
| 2,275,532 | 3/1942 | Lamberger et al. | 73—151 |
| 3,185,517 | 4/1965 | Coberly | 166—75 |

OTHER REFERENCES

J. L. Buster: Multiple Tubingless Completions, The Oil and Gas Journal, June 8, 1964, pp. 121–125.

JAMES A. LEPPINK, *Primary Examiner.*